(No Model.)
T. H. LOGAN.
SPINDLE DRIVING DEVICE FOR SPINNING MACHINES.
No. 394,542. Patented Dec. 11, 1888.
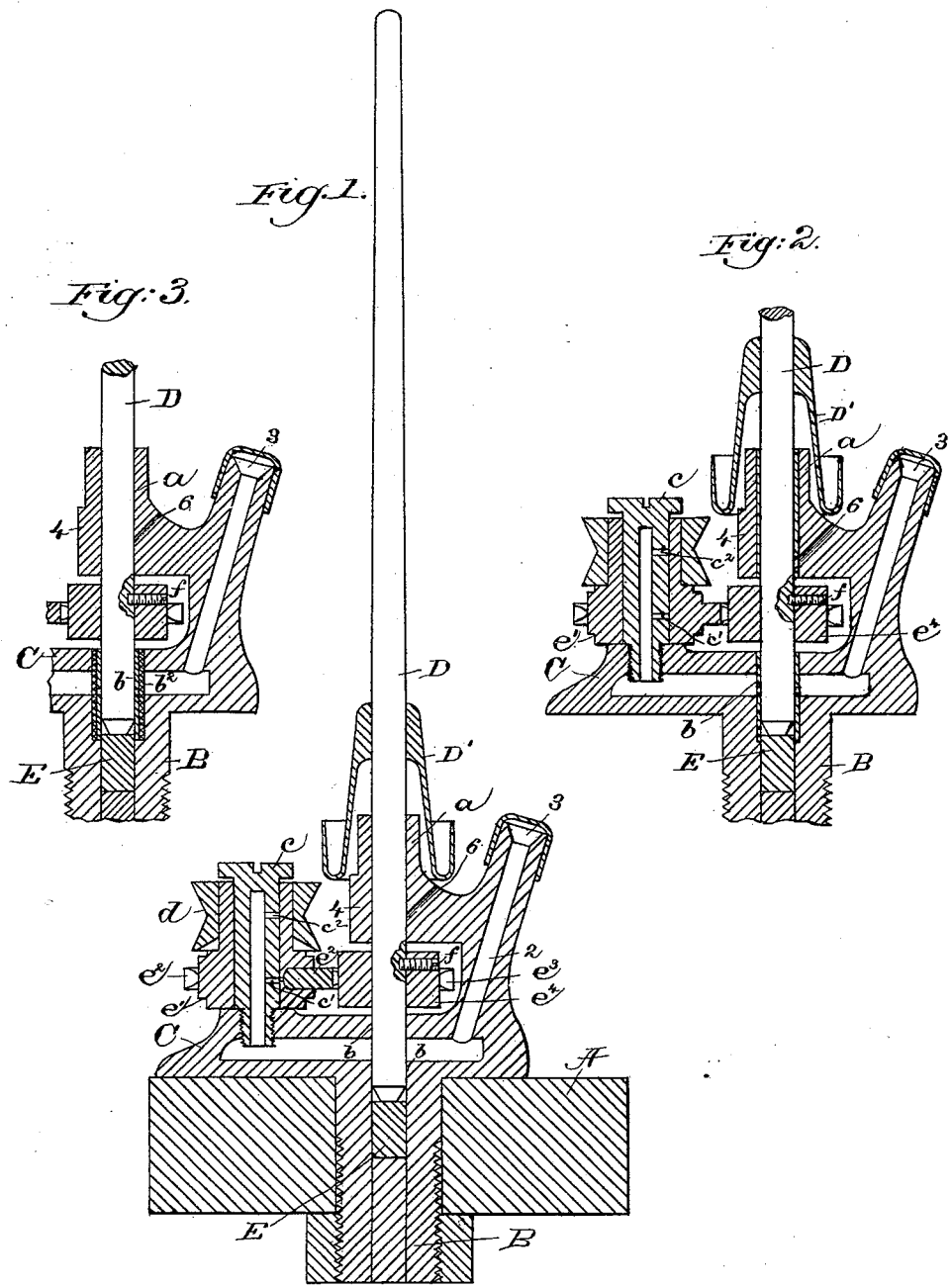

UNITED STATES PATENT OFFICE.

THOMAS H. LOGAN, OF LOWELL, ASSIGNOR TO THE SAWYER SPINDLE COMPANY, OF BOSTON, MASSACHUSETTS.

SPINDLE-DRIVING DEVICE FOR SPINNING-MACHINES.

SPECIFICATION forming part of Letters Patent No. 394,542, dated December 11, 1888.

Application filed November 3, 1887. Serial No. 254,160. (No model.)

*To all whom it may concern:*

Be it known that I, THOMAS H. LOGAN, of Lowell, county of Middlesex, and State of Massachusetts, have invented an Improvement in Spindle-Driving Devices for Spinning-Machines, of which the following description, in connection with the accompanying drawings, is a specification, like letters on the drawings representing like parts.

This invention has for its object to simplify the construction, and especially to lessen the wear, of the spindle-bearing, due especially to the pull of the band upon the spindle.

In accordance with my invention a spindle having its bearings in a spindle-support has attached to it a toothed gear which is engaged and rotated by another toothed gear connected to or made part of a whirl free to turn upon a hollow stud or shaft parallel to the spindle, the driving-band for imparting motion to the spindle being passed around the said whirl rather than around a whirl upon the spindle, the said hollow stud having holes in it for the passage of oil to the interior of the whirl. Above its upper bearing the spindle has attached to it a sleeve or bushing which constitutes a seat or holder for the lower end of the bobbin, the upper bearing for the spindle, as herein shown, being extended up into the said sleeve.

The spindle, as herein represented, has two independent lateral bearings below the sleeve referred to, each one, as herein shown, being rigid, the lower end of the spindle resting upon an independent step forced into the support, the said support being provided with oil-inlets and suitable passages to conduct oil to both the said lateral bearings.

The teeth of the gears referred to will preferably be of different material, and, preferably, one of the gears will have teeth made of wood driven into holes in the said gear; but instead of wood the teeth may be of two different metals to avoid undue wear of one upon the other, as is well understood.

Figure 1 in vertical section shows a spindle-support and rail and gearing and whirl embodying my invention, the spindle being in elevation and its attached sleeve-whirl in section; and Figs. 2 and 3 are similar views of modifications of my invention, to be referred to.

The rail A, provided with a suitable hole, receives within it a threaded shank, B, of a spindle-support, C, it having at one side an upright portion, as 2, made hollow, and provided with an inlet, as 3, for oil, and with a laterally-extended upper bearing, as 4, for the spindle, and an oil-inlet, as 6, for the said upper bearing. The portion 4, as well as the main body of the support, is bored to form a straight passage for the reception of the lower end or pintle of the spindle D below the attachment to it of the sleeve D′, the inner walls of the holes so formed constituting rigid bearings $a\ b$ for the lower end of the spindle, the lower extremity of the spindle resting upon a step, as E, preferably of steel, and driven up through the shank B from below. I desire it to be understood, however, that I may, if desired, provide each of the said bearing portions with an independent bearing of usual construction, as in section, Fig. 2, where the said bearing portions are both shown as provided with independent bearing-surfaces $a\ b$.

The support, as herein shown, has erected upon it, near the spindle-bearings, a stud, as $c$, about which turns freely a whirl, as $d$, having attached to or forming part of it a gear, $e'$, having teeth $e^2$, which engage teeth $e^3$ of a gear, $e^4$, fastened upon the spindle, as herein shown, between the portion 4 and the main body of the spindle-support, the attachment of the said gear to the spindle being preferably by means of a screw, as $f$. The lower end of the hollow stud $c$ (see Figs. 1 and 2) terminates in the chamber containing oil employed to lubricate the step-bearing.

As shown in Figs. 1 and 3, the teeth of the gears $e'\ e^4$ referred to are made of wood, their shanks or inner ends being forced into the hubs of the gears, such teeth being noiseless; but I desire it to be expressly understood that the said teeth may be of metal, as represented in Fig. 2, and may form integral parts of the hubs of the gears, and one of the said gears may be of one and the other of another metal, so as to obviate undue wear by the friction of one gear into the other, and when worn the said teeth may be removed and new teeth substituted for them.

Fig. 3 shows a second modification of my invention, wherein the spindle-bearing surface $b$ at the lower end of the spindle is surrounded by an elastic packing, as $b^2$, my invention in rotating the spindle being applicable also to that class of spindle. The stud $c$ is made hollow, as shown, and provided with oil-ducts $c'$ $c^2$ to oil the surfaces which rotate about it.

I have herein shown, but I do not claim, one rigid and one loose bearing for a spindle, as such is not of my invention.

I claim—

The spindle-support having bearings for the spindle, and the spindle and its attached gear, and the hollow stud $c$, having oil-passages in communication with the oil-chamber of the spindle-support, combined with the wheel and gear free to turn on the said stud, substantially as described.

In testimony whereof I have signed my name to this specification in the presence of two subscribing witnesses.

THOMAS H. LOGAN.

Witnesses:
S. C. CLARK,
B. M. HUTCHINS.